United States Patent [19]
Jeffrey et al.

[11] 3,946,859
[45] Mar. 30, 1976

[54] DRIVE MOUNTING FOR ELEVATOR SCRAPER

[75] Inventors: Charles Jerrold Jeffrey, Pekin; Albert Edward Rust, Morton; Willaim Albert Winslow, Washington, all of Ill.

[73] Assignee: Caterpillar Tractor Co., Peoria, Ill.

[22] Filed: Aug. 2, 1974

[21] Appl. No.: 494,088

[52] U.S. Cl. ............................... 198/203; 403/228
[51] Int. Cl.² ........................................ B65G 23/22
[58] Field of Search ........ 198/168, 203; 267/57.1 R, 267/57.1 A; 248/9, 10, 21, 23; 403/225, 228; 37/8

[56] References Cited
UNITED STATES PATENTS

| | | | |
|---|---|---|---|
| 1,785,141 | 12/1930 | Morton | 198/203 |
| 2,071,114 | 2/1937 | Crumb et al. | 198/203 |
| 2,129,933 | 9/1938 | Hueglin | 403/228 X |
| 2,294,452 | 9/1942 | Guy | 403/228 X |
| 2,484,191 | 12/1949 | Soldan | 403/228 X |
| 2,689,755 | 9/1954 | Krotz | 267/57.1 R |
| 2,965,217 | 12/1960 | Dommann et al. | 198/203 |
| 3,360,107 | 12/1967 | Lockwood | 198/203 |
| 3,543,915 | 12/1970 | Grosslaus | 198/203 |
| 3,668,794 | 6/1972 | Marquardt | 198/203 X |

Primary Examiner—John J. Love
Assistant Examiner—Richard K. Thomson
Attorney, Agent, or Firm—Phillips, Moore, Weissenberger, Lempio & Strabala

[57] ABSTRACT

A drive mounting for an elevator of a scraper vehicle having a main drive shaft carrying a pair of driving sprockets coupled to an elevator drive unit at one side of the frame, in which the drive unit is mounted in a spherical type joint at one end thereof and is carried at the other end thereof by a resilient mounting carried in a vertical socket capable of limited swivel and pivotal movement. The resilient mounting also has a pivot along a horizontal axis offset from the drive shaft axis. This mounting prevents stresses from being set up therein when the drive unit is mounted, and also absorbs shock during operation. Means are also provided for holding the main drive shaft in place separate from its associated motor and gear drive to facilitate assembly and motor maintenance.

7 Claims, 4 Drawing Figures

U.S. Patent  March 30, 1976  Sheet 1 of 2  3,946,859
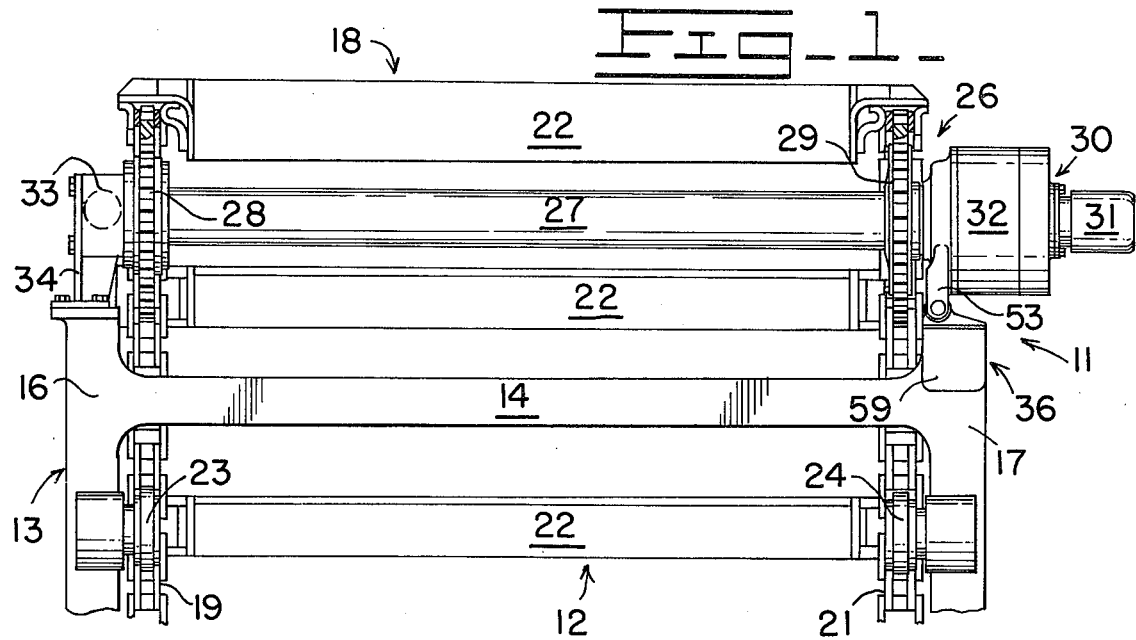
Fig_1_
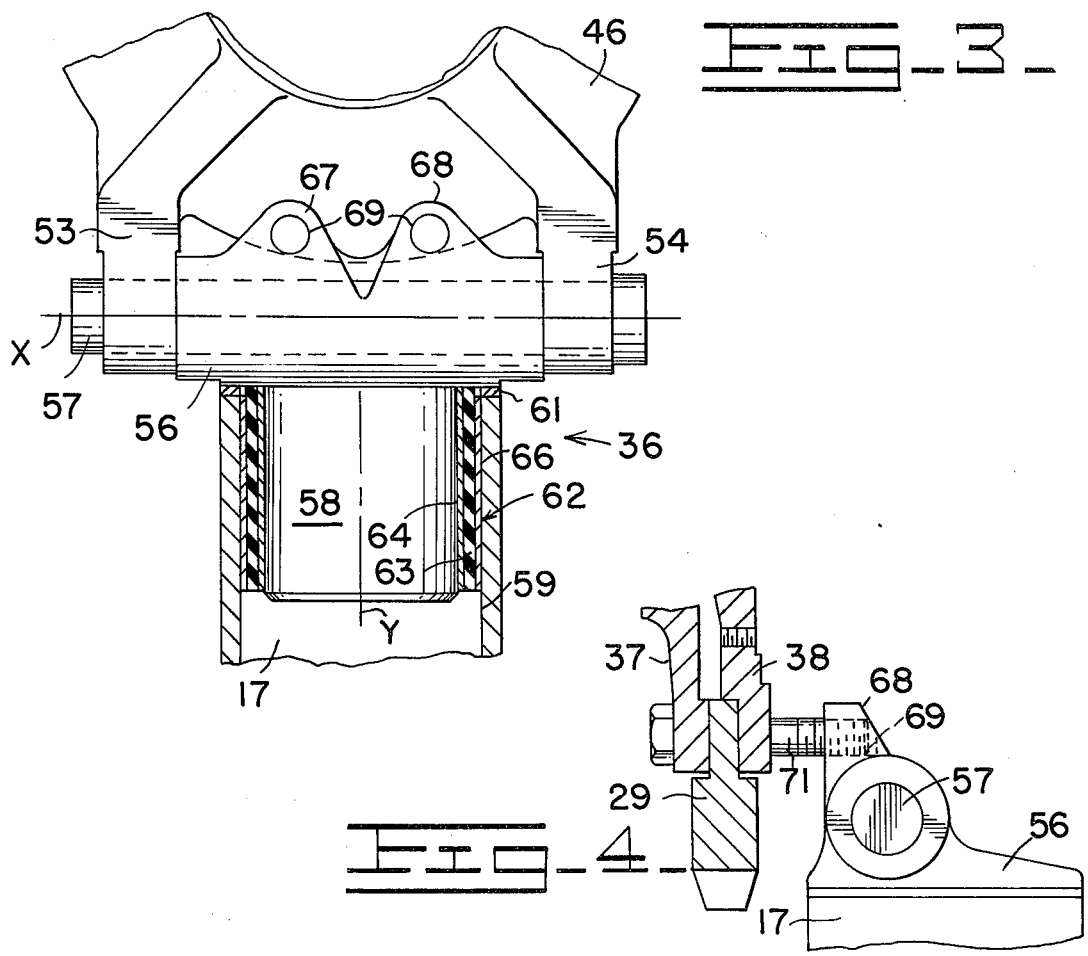
Fig_3_
Fig_4_

DRIVE MOUNTING FOR ELEVATOR SCRAPER

BACKGROUND OF THE INVENTION

The present invention relates to improvements in a drive mounting for an elevator scraper, and more particularly, to such a drive mounting having means for preventing axial misalignment.

Elevator scrapers typically contain a large rectangular frame member mounted on a vehicle, with the frame member supporting all of the elevator structure including the drive unit therefor. Such drive mountings generally comprise a main drive shaft mounted on the frame at each side thereof, with main drive shaft having a pair of drive sprockets adapted to drive a pair of endless chains. The chains are supported on suitable idlers also carried on the frame and comprise a plurality of transverse flights for conveying dirt and like material into the bowl of the scraper. The main drive shaft is provided with a motor and gear reduction unit suitable for driving said shaft, and in the present invention, the motor and gear unit are preferably carried at one end of the shaft externally of the main drive.

Such elevator scraper drive systems have been in use for a long time and are eminently satisfactory. However, certain problems have arisen which contribute to the wear of the device and facility of use thereof. The present invention is directed toward improvements in solving these problems.

Specifically, when the drive structure is mounted onto the frame, the manufacturing tolerances of the frame frequently cause one end of the drive structure to be axially misaligned with the other. Consequently, mountings should be provided to accommodate for such misalignment between the opposite ends of the drive structure to prevent the creation on undue stresses in the various components thereof, because such stresses may eventually cause a failure and reduce the useful life of the structure. In addition, stresses are caused in the elevator frame during use of the scraper such as when rocks or the like are struck, because such forces tend to temporarily affect slight changes in the frame configuration. Due to the large size of the frame, very slight changes in alignment and stress forces are sufficient to affect these alignment problems. Accordingly, means should be provided to protect the mounting bearing structures. However, it is also important that the structure be strong and maintain rigidity in order to operate effectively.

Another problem which has been encountered in elevator scrapers resides in the fact that the drive motor for the scraper frequently needs more maintenance and/or replacement than the other drive elements. When such motor maintenance is conducted, it has heretofore been necessary to provide support for the extremely heavy elevator drive components externally of the machine. In other words, the motor and associated gearing could not be removed without disconnecting a support for the main drive shaft on which all of the other elevator drive elements are supported.

SUMMARY OF THE INVENTION

It is therefore a primary object of the present invention to provide a drive mounting for elevator scrapers in which means are provided to compensate for axial misalignment, which is likely to occur both in the assembly and use of the machine.

Another object of the invention is to provide a drive mounting arrangement of the character described in which means are provided to absorb shocks during the operation of the device.

A further object of the invention is to provide a construction designed to facilitate maintenance thereof.

These and other objects are achieved by the provision of a drive mounting for an elevator of a scraper vehicle having a main drive shaft mounted to the frame with a spherical-type joint at one end and a special resilient supporting attachment at the other end. The resilient support includes an offset pivot together with a socket having a resilient bushing. The bushing provides for a small amount of swivel along a vertical axis together with a very slight amount of pivot in any axis on a somewhat horizontal plane.

The main drive shaft carries a drive motor at one end thereof, with the drive motor being carried at the same end as the resilient socket joint so as to provide protection for the motor. In addition, means are provided for supporting the drive shaft on the resilient mount when the motor is removed in order to support the heavy elevator mechanism in place during motor maintenance.

Further features of advantage are obtained from additional specific structures which are more fully described in connection with the description of the preferred embodiment below.

BRIEF DESCRIPTION OF THE DRAWING

A preferred form of the invention is illustrated in the accompanying drawing forming a part of this description, in which:

FIG. 1 is a front elevational view showing the upper portion of an elevator construction equipped with a drive mounting constructed according to the invention;

FIG. 3 is a fragmentary side elevational view of a portion of the structure shown in FIG. 2; and FIG. 4 is a fragmentary view of a portion of the structure shown in FIG. 2 illustrating the attachment utilized during maintenance of the drive motor.

Figure 2:
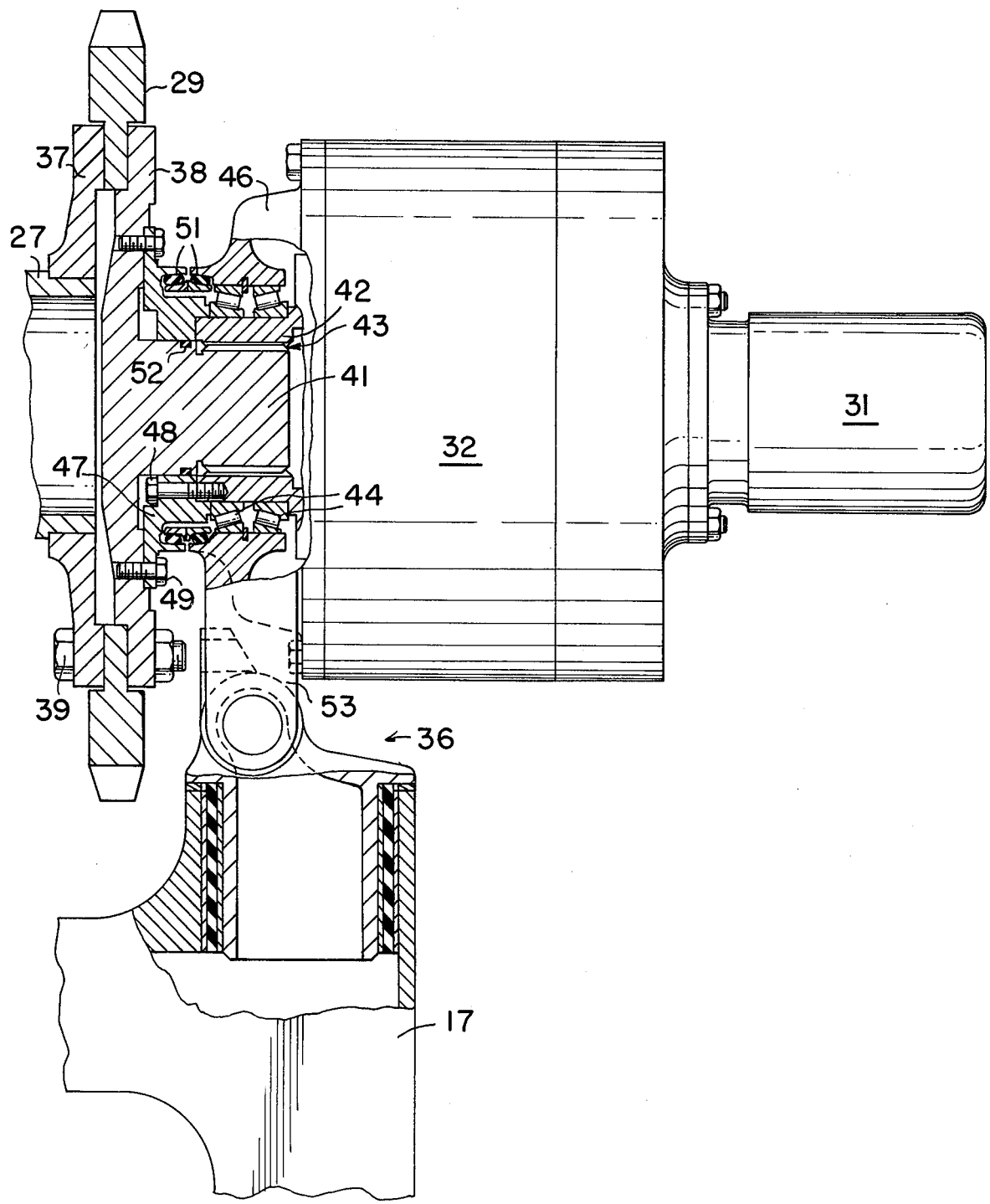
FIG. 2 is an enlarged fragmentary view of the side portion of the structure shown in FIG. 1, having the drive unit thereon with part being broken away to illustrate internal parts, some of which are shown in section.

While only the preferred form of the invention is shown, it should be understood that various changes or modifications may be made within the scope of the claims attached hereto without departing from the spirit of the invention.

DETAILED DESCRIPTION OF THE PREFERRED EMBODIMENT

Referring now more particularly to the drawings, a drive mounting assembly 11 is shown in association with a rearwardly inclined elevator 12 for a scraper vehicle (not shown). The elevator 12 is provided with a box-type main frame, the upper end of which is shown at 13. The frame 13 comprises a pair of transverse frame members with upper frame members 14 being shown extending between the interconnecting upper ends of a pair of right and left-hand side frame members 16 and 17.

The elevator 12 is provided with a conveying mechanism 18, which includes a pair of laterally-spaced endless chains 19 and 21 interconnected by a plurality of transverse flights 22. The main frame 13 also comprises a pair of intermediate idler wheels 23 and 24 individually secured to the opposite side frame members 16 and 17, and which are utilized for supporting the endless chains of the conveying mechanism in their circumposed relationship about the main frame.

The elevator further includes a drive means 26 mounted transversely across the upper end of the main frame 13 for driving the conveying mechanism 18 about the perimeter of the frame. The drive means comprises an elongated tubular drive shaft 27 having a pair of sprocket wheels 28 and 29 mounted thereon for rotation therewith disposed adjacent the opposite ends thereof. The drive means further comprises a drive unit 30 including a hydrostatic motor 31 connected in driving relation to the shaft 27 through a speed-reducing gear drive 32.

The end of the drive shaft 27 opposite the motor is rotatably mounted by a universal-type bearing such as the spherical bearing 33 carried by a bracket 34, which in turn is attached to the upper end of the side frame member 16. The other end of the drive shaft 27 is mounted to the upper end of side frame member 17 through a resilient supporting attachment 36.

As best seen in FIG. 2, the sprocket wheel 29 is disposed between a pair of radially extending flanges 37 and 38. A plurality of circumferentially-spaced bolts, one of which is shown at 39, secure the flanges and the sprocket wheel together. The radial flange 37 is fixedly secured to the adjacent end of the tubular drive shaft 27 by welding or other suitable means, while the radial flange 38 is formed integrally with an axially-disposed stub shaft 41.

The gear drive 32 is provided with a tubular output shaft 42 which is adapted to receive stub shaft 41 through a slip-spline connection 43. Such shafts are radially supported by a pair of tapered rolling bearing units 44 which are mounted in a cover 46 attached to gear drive 32. The stub shaft 41 and output shaft 42 are axially coupled by a flanged retainer 47. The retainer 47 is secured to the outer end of the output shaft 42 by bolts 48, and is detachably mounted to the flange 38 of the stub shaft 41 by a plurality of externally-accessible bolts 49. A duo-cone seal 51 is disposed between the relatively rotatable retainer 47 and the cover 46, and a static O-ring seal 52 is disposed between the stub shaft 41 and the retainer for sealing purposes.

The resilient supporting attachment 36 is normally connected through cover 46 of gear drive 32, which cover includes a pair of parallel legs 53 and 54 (see FIG. 3). A mounting bracket 56 is disposed between such legs, and a pin 57 is fed through suitable bearing surfaces in mounting bracket 56 and the legs 53 and 54. This pin is utilized for pivotally connecting the drive mounting assembly about a first pivot axis "X," which is disposed in elevationally-offset perpendicular relation to the rotational axis of the drive system substantially as shown in the drawing.

The bracket 56 is provided with a trunnion 58 received in a cylindrical socket 59 formed into the upper end of the side frame member 17. Axial loads, relative to the trunnion, are carried through a thrust-washer 61 disposed between the outer end of socket 59 and the bracket 56. Radial loads relative thereto are carried through a resilient bushing 62 disposed between the trunnion and socket. The resilient bushing 62 is made as a separate unit and comprises an elastomeric sleeve 63 securely bonded between an inner metal sleeve 64 and an outer metal sleeve 66.

In addition, resilient bushing 62 is press-fitted into the socket and the trunnion 58 pressed into the bushing. In this way, the trunnion is securely anchored into the socket, but with a certain amount of freedom of movement being allowed by the resiliency in the elastomeric sleeve. Thus limited swivel movement of the bracket relative to the socket is permitted through the elastic properties of the sleeve in shear. Such swivel movement is about a second axis "Y" which is disposed perpendicular to both the first pivot axis "X" and the rotational axis of the drive shaft 27. In addition, a slight transverse shift and corresponding pivoting within the socket is permitted in the form of a very slight tilt of the "Y" axis. In this way, it is seen that the drive mounting assembly is firmly held in place, yet is capable of sufficient movement to compensate for slight variations in manufacturing tolerances, and is equipped with a resilient mounting sufficient to help absorb shocks during operation.

As explained above, the resilient supporting attachment 36 is formed to hold the drive mounting assembly through the cover 46 of gear drive 32. However, during servicing and maintenance, it is often desirable to remove the motor 31 and gear box 32 by disconnecting them from the rest of the drive mounting assembly through uncoupling of spline connection 43. In order to effect this removal, it is important to hold the drive mounting assembly in place. In order to obviate the need for utilizing external means such as a hoist in order to hold this very heavy piece of machinery, the preferred form of the invention provides holding means separate from the normal cover attachment.

As best shown in FIGS. 3 and 4, the mounting bracket 56 also comprises a pair of upstanding ears 67 and 68 protruding therefrom and disposed adjacent to the sprocket wheel 29. Each ear is provided with a threaded aperture 69, with such apertures positioned so that they may be axially aligned with a pair of adjacent sprocket mounting bolts 39 upon appropriate rotation of the sprocket wheel 29. With the axial alignment thus made, bolt 39 is replaced with a longer bolt 71 formed to fit into the threaded apertures 69 of ears 67 and 68.

From the foregoing description, it is seen that the resilient attachment 36 cooperates with the spherical mounting 33 to permit self-alignment of the drive structure and thereby prevent undue stresses which might otherwise be caused by the usual slight misalignment of such ends. In addition to the compensating alignment, it is seen that the supporting structure provides an excellent, strong and firm support for the drive mounting arrangement, which is important in assuring accurate control in the use thereof. In addition; the resilient supporting attachment provides for a degree of shock-absorbing in the area adjacent the motor and associated parts thereby protecting bearing surfaces from excessive stresses when the scraper strikes rock or the like.

In order to service the hydrostatic motor 31 and associated gear drive 32, the following procedure is utilized: first the sprocket 29 is rotated to align bolts 39 with the threaded apertures 69 of ears 67 and 68, two of the bolts 39 are removed and replaced by the longer bolts 71, which thread into the apertures 69 as illustrated in FIG. 4. With sprocket 29 thus secured, bolts 49 are removed to disconnect the retainer 47 from the flange 38, and pin 57 is removed to disconnect the gear cover 46 from the resilient supporting structure 36.

The drive unit is then removed by pulling it axially outward to slidably remove it from the stub shaft 41 and disengage the spline connection 43.

It will be appreciated that in the absence of the supporting structure utilized herein, some type of hoist would normally have to be used to support the drive structure when removing the drive unit. Due to its excessive weight, such operation involves certain difficulties. These difficulties not only include the need for supporting the elevator, but in realigning the holes for pin 57 and bolts 49 to be re-inserted on re-assembly. However, the holding means not only avoids the use of a hoist or the like, but it retains the drive shaft in its aligned position to facilitate this reassembly.

From the foregoing description, it is seen that an improved drive mounting for elevator scrapers and the like is provided which has improved self-compensating features and other advantages which reduce the wear of the device to facilitate maintenance therefor.

What is claimed is:

1. In a scraper elevator having a main supporting element and a conveying mechanism comprising a drive structure having a pair of laterally disposed drive sprockets carried on a drive shaft driven by a demountable elevator drive unit, in combination, means for mounting the drive structure on the main supporting element comprising
   universal support means pivotable on three axes for connecting one end of the drive shaft to the main supporting element; and
   resilient support means connecting the other end of the drive shaft to the main supporting element and acting in cooperation with said universal supporting means for compensating for misalignment of said main supporting element relative to said drive shaft and for maintaining said drive shaft in said relation upon removal of said drive unit, said main supporting element defining a bore having an axis substantially parallel to the longitudinal axis of said main supporting element and wherein said resilient support means comprises a pivot means offset from the axis of the drive shaft and pivotable on an axis perpendicular to the axis of the main supporting element, a trunnion received in said bore and having an axis substantially perpendicular to the axis of said drive shaft, and an elastomeric bushing member disposed around said trunnion for allowing limited restrained movement of said trunnion in said bore.

2. A drive mounting for elevator scrapers and the like, the elevator having an associated conveying mechanism, the drive mounting comprising
   main frame means formed for mounting on a vehicle and adapted to carry said elevator and associated conveying mechanism, said main frame means comprising a first frame element, a second frame element substantially parallel to said first frame element, and a transverse element rigidly interconnecting the first frame element of the second frame element;
   a drive shaft for driving said elevator and associated conveying mechanism;
   a geared drive unit demountably connected to one end of said shaft;
   a universal supporting attachment connecting the other opposite end of said drive shaft to said first frame element; and
   a resilient supporting means acting in cooperation with said universal supporting attachment and connecting the one end of said drive shaft to the second frame element for compensating for misalignment of said first frame element with said second frame element while allowing removal of said geared drive unit from said drive shaft, said resilient supporting attachment comprising
   a pivot means offset from the axis of the drive shaft and perpendicular to the axis of said drive shaft, and wherein the second frame element defines a socket having an axis substantially perpendicular to the axis of said drive shaft and said pivot axis,
   a trunnion associated with said pivot and providing a male section adapted to fit within said socket, and
   a resilient bushing force-fitted between said socket and said trunnion.

3. A drive mounting for elevator scrapers as defined in claim 2, in which the resilient bushing comprises an inner metal sleeve and an outer metal sleeve, and an elastomeric sleeve fitted therebetween, said elastomeric sleeve being bonded to both of said metal sleeves.

4. A drive mounting for elevator scrapers as defined in claim 3, in which the resilient supporting attachment has its pivot axis substantially perpendicular to the plane of the main frame means, and its trunnion axis substantially parallel to longitudinal axis of the main frame.

5. A drive mounting for elevator scrapers and the like, comprising:
   elevator frame means formed for mounting on a vehicle and adapted to carry an associated conveying mechanism,
   a drive shaft mounted on said frame for driving said elevator conveying mechanism,
   a universal supporting attachment for connecting one end of said drive shaft to the main supporting frame,
   a resilient supporting attachment for connecting the other end of the drive shaft to the main support frame,
   a drive unit carried on one end of said shaft and comprising a drive motor and gear means carried in a suitable housing,
   removable connecting means for drivingly connecting the drive unit with the drive shaft,
   said resilient supporting attachment comprising a socket carried on the main frame, a trunnion pivotally attached to the housing for the drive unit, and a resilient bushing fitting between said trunnion and said socket for securing the trunnion and socket together, and
   independent holding means for temporarily attaching the drive shaft to the resilient supporting attachment whereby the drive unit may be removed without moving the drive shaft.

6. A drive mounting for elevator scrapers as defined in claim 5, in which the resilient bushing comprises an inner and outer metal sleeve, and an elastomeric sleeve fitting therebetween, said elastomeric sleeve being bonded to both of said metal sleeves.

7. A drive mounting for elevator scrapers as defined in claim 6, in which the resilient supporting attachment has its pivot axis substantially perpendicular to the plane of the main frame, and its socket axis substantially parallel to the main frame.

* * * * *